Patented Apr. 7, 1953

2,634,282

UNITED STATES PATENT OFFICE 2,634,282

TRIORGANOSILYL-SUBSTITUTED DIKETONES

Leo H. Sommer, State College, Pa., assignor to Dow Corning Corporation, Midland, Mich., a corporation of Michigan No Drawing. Application December 13, 1951, Serial No. 261,600

5 Claims. (Cl. 260—448.2)

This invention relates to diketones having triorganosilyl groups substituted therein.

In this application Me designates the methyl radical and Et the ethyl radical.

This invention relates to ketones of the formula RMe$_2$SiCH$_2$CH$_2$COCH$_2$COX where X is a monovalent hydrocarbon radical or the radical (RMe$_2$SiCH$_2$CH$_2$—) and R is selected from the group consisting of methyl and phenyl groups.

The above compounds may be prepared by reacting a methyl ketone with an ester in the presence of sodamide. Ketones which are applicable to this invention are those of the formula XCOCH$_3$ where X is a monovalent hydrocarbon radical or a triorganosilyl radical of the formula RMe$_2$Si(CH$_2$)$_2$—. The esters are of the formula YCOOR' where R' is a monovalent hydrocarbon radical and Y is a monovalent hydrocarbon radical or a radical of the formula RMe$_2$Si(CH$_2$)$_2$—. Thus it can be seen that the defined triorganosilyl radicals may be present in either the reacting ketone or the reacting ester or they may be present in both.

The reaction may be represented by the generic equation

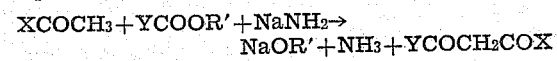
NaOR'+NH$_3$+YCOCH$_2$COX

This reaction proceeds smoothly at room temperature although in some cases it may be desirable to carry out the reaction at reflux temperature of the solvents employed. Suitable solvents include ethers such as diethyl ether.

Methylketones which are operative in preparing the materials of this invention are those in which the other radical attached to the carbonyl may be any monovalent hydrocarbon radical or it may be the radical RMe$_2$Si(CH$_2$)$_2$—. Thus the ketones may be methylalkyl ketones such as acetone, methylethyl ketone, methyloctadecyl ketone, and the like, or arylmethyl ketones such as phenylmethyl ketone, tolylmethyl ketone, naphthylmethyl ketone and the like, or alkarylmethyl ketones such as benzylmethyl ketone, or cycloalkylmethyl ketones such as cyclohexylmethyl ketone, or unsaturated hydrocarbon methyl ketones such as allylmethyl ketone, cinnamylmethyl ketone and methylethylidene ketone.

The esters employed in this invention are YCOOR' in which R' may be any alkyl radical such as methyl, ethyl, or octadecyl and Y may be any monovalent hydrocarbon radical or the radical RMe$_2$Si(CH$_2$)$_2$—. Examples of such esters include ethyl acetate, octadecyl acetate, methyl stearate, ethyl propionate, propyl heptoate, ethyl acrylate, butyl crotonate, methyl propiolate, ethyl benzoate and methyl cinnamate. It is immaterial in which reactant the triorganosilyl radical appears. Thus the ketones of this invention may be prepared by any one of the three reactions given below:

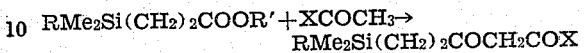

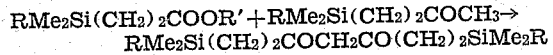

The products of this invention are of utility as additives for organosiloxane fluids. In addition, copper chelates of the diketone may be prepared and these compounds used as additives for siloxane fluids.

The copper chelates are prepared by reacting the ketones with copper acetate in hot alcoholic solution. The chelates crystallize from the solution in the form of blue needles and may be collected by filtration.

The ketones of the formula RMe$_2$(CH$_2$)$_2$COCH$_3$ are prepared according to the method described in the applicant's copending application Serial No. 204,273, filed January 3, 1951, and assigned to the assignee of this invention. Esters of the formula RMe$_2$Si(CH$_2$)$_2$COOR' may be prepared according to the method described in the applicant's copending application Serial No. 204,274, filed January 3, 1951, and assigned to the assignee of this invention.

The following examples are illustrative only and are not to be construed as limiting the invention which is properly delineated in the appended claims.

Example 1

300 ml. of anhydrous ammonia was placed in a cool, dry flask and stirred as 15.2 grams of sodium was added in small portions. A crystal of ferric nitrate was added to catalyze the reaction. The excess ammonia was allowed to evaporate and 300 ml. of anhydrous ether was added. The suspension of sodamide was stirred at reflux for 15 minutes. Thereafter was added with stirring a solution of 18 grams of acetone and 50 ml. of anhydrous ether. The reaction mixture was then stirred for an additional 5 minutes. A solution of 52.2 grams of ethyl-beta-trimethyl-silylpropionate [Me$_3$Si(CH$_2$)$_2$COOEt] in 50 ml. of anhydrous ether was then added over a period of 1½ hours. Stirring was continued for an additional 2 hours while the reaction mixture was kept at reflux temperature on a steam bath.

The reaction mixture was then poured into 302 ml. of water and the solution was made slightly acidic with dilute HCl. The organic layer was separated and the aqueous layer was extracted twice with 100 ml. portions of ether. The combined organic layer and ether extracts were washed with water and then with 5 per cent sodium bicarbonate solution and again with water. They were then dried over anhydrous sodium sulphate and the ether was removed. The resulting product was distilled and there was isolated the compound $Me_3Si(CH_2)_2COCH_2COMe$ boiling 76° C. at 4.5 ml. The material had a refractive index of 1.4628 at 20° C.

A hot aqueous solution of cupric acetate was added to a hot alcoholic solution of the above diketone. The resulting solution was permitted to stand over night and then cooled in a refrigerator, whereupon the chelate crystallized and was separated by filtration. After 2 recrystallizations from a 50 per cent ethanol-water solution, the chelate was obtained as a light blue microcrystalline solid having a melting point of 101° to 102° C.

*Example 2*

.6 mol of a sodamide was prepared as in Example 1. To this was then added a solution of 43.2 grams of the ketone 5,5-dimethyl-5-sila-2-hexanone [$Me_3Si(CH_2)_2COMe$] in 50 ml. of anhydrous ether. It was stirred for 15 minutes and there was then added a solution of 52.9 grams of ethyl acetate in 50 ml. of anhydrous ether. The reaction mixture was heated on a steam bath for 1 hour after the addition of the ester was complete. The reaction mixture was then made acid and washed as in Example 1 and upon distillation the compound $$Me_3Si(CH_2)_2COCH_2COMe$$

was obtained.

*Example 3*

.6 mol of sodamide was prepared as in Example 1. To this was added with vigorous stirring over a period of 25 minutes a solution of 43.2 grams of $Me_3Si(CH_2)_2COMe$ in 50 ml. of anhydrous ether. The resulting solution was stirred and there was then added a solution of 104.4 grams of $Me_3Si(CH_2)_2COOEt$ in 50 ml. of anhydrous ether over a period of 45 minutes. The reaction mixture was then stirred at reflux temperature for 3¼ hours and finally poured into 1 liter of water. The material was then washed and dried and distilled. A redistillation of the crude distillate gave the diketone $$Me_3Si(CH_2)_2COCH_2CO(CH_2)_2SiMe_3$$

which boiled at 149° C. at 9 mm. and had a refractice index of 1.4666 at 20° C.

A hot aqueous solution of cupric acetate was added to a hot alcoholic solution of the above ketone. The resulting solution was cooled whereupon the chelate crystallized and was filtered. The material was recrystallized from 95 per cent ethanol and the chelate was obtained as steel blue needles having a melting point of 123.5 to 124.5° C.

*Example 4*

When ethyl-beta-phenyldimethylsilylpropionate is reacted with each of the ketones shown below, in the manner of Example 1, the corresponding trimethylsilyl - substituted diketones shown below are obtained.

| Starting Ketone | Diketone Obtained |
| --- | --- |
| $CH_3COCH_2CH=CH_2$ | $C_6H_5Me_2Si(CH_2)_2COCH_2COCH_2CH=CH_2$ |
| $CH_3COC_6H_5$ | $C_6H_5Me_2Si(CH_2)_2COCH_2COC_6H_5$ |
| $CH_3COCH_2C_6H_5$ | $C_6H_5Me_2Si(CH_2)_2COCH_2COC_6H_5$ |
| $CH_3COC_{11}H_{23}$ | $C_6H_5Me_2Si(CH_2)_2COCH_2COC_{11}H_{23}$ |
| 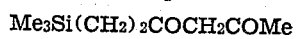 | 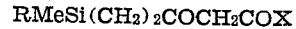 |
| $CH_3COCH=CHC_6H_5$ | $C_6H_5Me_2Si(CH_2)_2COCH_2COCH=CHC_6H_5$ |

That which is claimed is:
1. A ketone of the formula $$RMeSi(CH_2)_2COCH_2COX$$

where R is selected from the group consisting of methyl and phenyl radicals and X is selected from the group consisting of monovalent hydrocarbon radicals and a radical of the formula $RMe_2Si(CH_2)_2-$ where R is as above defined.

2. A ketone in accordance with claim 1 where X is an alkyl radical.
3. $Me_3Si(CH_2)_2COCH_2COCH_3$.
4. $RMe_2Si(CH_2)_2COCH_2CO(CH_2)_2SiMe_2R$ where R is selected from the group consisting of phenyl and methyl radicals.
5. $Me_3Si(CH_2)_2COCH_2CO(CH_2)_2SiMe_3$.

LEO H. SOMMER.

No references cited.